United States Patent [19]

Kidder

[11] 4,069,280
[45] Jan. 17, 1978

[54] METHOD OF MAKING PLASTIC OPTICAL FIBERS

[76] Inventor: Raymond W. Kidder, c/o Kidco Incorporated, P.O. Box 278, Medford, N.J. 08055

[21] Appl. No.: 299,187

[22] Filed: Oct. 20, 1972

[51] Int. Cl.² .............................................. B29D 11/00
[52] U.S. Cl. ...................................... 264/1; 264/102; 264/230; 264/249; 264/291
[58] Field of Search .................. 264/1, 230, 249, 102, 264/291

[56] References Cited

U.S. PATENT DOCUMENTS

| | | | |
|---|---|---|---|
| 2,980,957 | 4/1961 | Hicks, Jr. | 264/1 |
| 2,989,785 | 6/1961 | Stahl | 264/230 |
| 3,198,059 | 8/1965 | Phaneuf et al. | 264/1 |
| 3,301,648 | 1/1967 | Sheldon | 264/1 |
| 3,438,116 | 4/1969 | Stengle, Jr. | 264/249 |
| 3,472,921 | 10/1969 | Fyfe | 264/1 |
| 3,560,598 | 2/1971 | Neefe | 264/1 |
| 3,691,263 | 9/1972 | Stoy et al. | 264/1 |
| 3,742,107 | 6/1973 | Hawkins | 264/1 |

*Primary Examiner*—James B. Lowe
*Attorney, Agent, or Firm*—Smith, Harding, Earley & Follmer

[57] ABSTRACT

A method of making plastic optical fibers in which a tubular plastic sheath is heated to a predetermined temperature in a vacuum chamber, a rod-like plastic core is inserted into the sheath in the vacuum chamber and the assembly is allowed to cool in the vacuum chamber to room temperature. The internal diameter of the sheath at the predetermined temperature is greater than the outer diameter of the core at room temperature so that said core can be inserted into the tube at the predetermined temperature. The internal diameter of the sheath at room temperature is less than the outer diameter of the core at room temperature so that when said assembly is allowed to cool from the predetermined temperature to room temperature, the tube will shrink tightly onto the core.

9 Claims, 3 Drawing Figures

ROOM TEMPERATURE

FORMING TEMPERATURE T

METHOD OF MAKING PLASTIC OPTICAL FIBERS

BACKGROUND OF THE INVENTION

This invention relates to the field of plastic optical fibers or synthetic optical fibers as they are also referred to in the art. More particularly, the invention relates to an improved method of making such fibers.

A prior method of making optical plastic fibers is illustrated in U.S. Pat. No. 3,472,921 and involves the injection of hot plasticized polystyrene into a pre-extruded acrylic sheath or tube. The method has the disadvantage that as a result of the temperature drop in the injected material, there is produced a gradient of styrene variability along the length of the sheath. Also, the viscosity changes of the injected plastic material along the length of the sheath will cause variance in the manner in which the injected material will adhere to the walls of the sheath along its length. In some cases there will be no adherence while in other cases there will be a meeting of the plastics or the causing of pearlization. In other words, the prior art methods have not produced a satisfactory interface between the core and the sheath in terms of quality and homogeneity throughout the length thereof.

SUMMARY OF THE INVENTION

It is the general object of the invention to provide the method of making plastic optical fibers which will produce an improved interfacial quality between the core and the sheath, which quality will be maintained throughout the length of the interface.

Briefly stated, the method of making plastic optical fibers in accordance with the invention involves heating the plastic sheath or tube to a predetermined temperature in a vacuum chamber, inserting a plastic core into the tube in the vacuum chamber and allowing the assembly to cool in the vacuum chamber to room temperature. The dimensional relationship between the core and the sheath is such that the core can be inserted into the sheath at the predetermined temperature and the sheath will shrink onto the core when said assembly is allowed to cool from the predetermined temperature to room temperature.

The method in accordance with the invention achieves an interface relationship between the core and the sheath which has no solubility distortion or pearlization whereby the final optical fiber will involve less scattering of light. Moreover, there will be a uniform quality of the interface from one end to the other. Furthermore, there will be no cracking of the outer sheath as it is cooled in the vacuum.

DESCRIPTION OF THE PREFERRED EMBODIMENT

In accordance with the method of the invention there is provided a cylindrical core 10 and a cylindrical tubular sheath 12 each made of a plastic (synthetic resin) suitable for use in making an optical fiber. Plastics suitable for use in the making of optical fibers are well known and specific suitable plastics will be described hereafter. Essential elements of a suitable plastic relate to good light transmission characteristics and the proper index of refraction. In accordance with present day techniques, the index of refraction of the core is greater than that of the sheath so that light rays which strike the interface between the core and the sheath at angles greater than the critical angle will be reflected into the core and travel to the other end of the fiber by successive reflections. The invention encompasses various plastics which are known in the art as being suitable for use in fiber optics.

Suitable plastics for use in the method in accordance with the invention are described in said prior-mentioned U.S. Pat. No. 3,472,921 and in British Pat. No. 1,037,498. Another suitable fiber comprises the plastics described in the specific example of the invention which appears hereafter.

Figure 2:
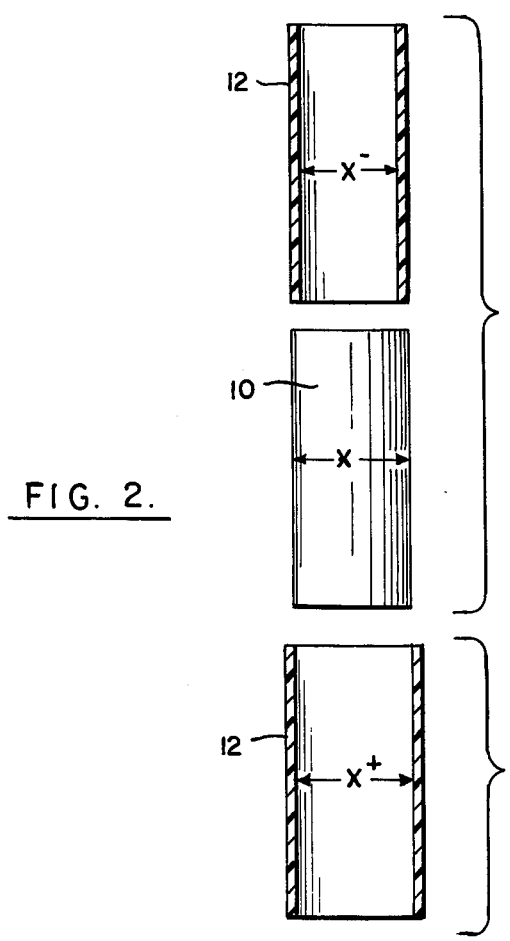
FIG. 2 is a view illustrating the dimensional relationship between the core and the sheath employed in making the optical fiber in accordance with the invention.

The core 10 and the sheath 12 are made by conventional extrusion techniques to a predetermined dimensional relationship as illustrated in FIG. 2. The dimensional relationship is such that the internal diameter X+ of the sheath 12 at a predetermined temperature T, which may be termed the forming temperature, is slightly greater than the outer diameter X of the core 10 at room temperature so that the core 10 can be inserted into the sheath at this forming temperature T. Moreover, the internal diameter X− of the sheath 12 at room temperature is less than the outer diameter of the core at room temperature so that when the assembly of the core 10 within the sheath 12 is allowed to cool from the forming temperature T to room temperature, the sheath 12 will shrink tightly onto the outer surface of the core 10. It will be apparent that this shrinking action will form a very accurate and homogeneous interface between the core and the sheath throughout the length thereof.

After the core 10 and the sheath 12 have been formed to the above dimensional relationship, they are placed in a Boule forming unit 14 the interior of which is maintained under a vacuum by a suitable vacuum source 16. The sheath 12 is placed in a heating section 17 of unit 14 provided with suitable heating units 18 while the core 10 is placed in a cooling section 20 provided with suitable cooling units 22 and located above heating section 17. The heating units 18 are operated to raise the temperature of the sheath 12 to the forming temperature T so that the internal diameter thereof will be expanded to an amount such that the core 10 can be inserted therein. The forming temperature T is below the heat distortion point of the plastic forming the sheath 12. The core 10 is maintained at room temperature by the cooling units 22. When the forming temperature T is reached, the core 10 is forced downwardly into the sheath by the action of a plunger 24 which extends into the upper end of the cooling section at a location provided with an air-vacuum seal.

Figure 3:
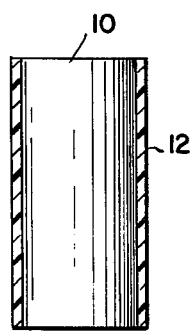
FIG. 3 shows a Boule formed in accordance with the method of the invention.

The assembly of the core 10 and sheath 12 is then allowed to cool in the vacuum chamber of unit 14 to room temperature. During this cooling, the sheath 12 will be shrunk-fit tightly onto the outer surface of the core 10. This assembly of the core and sheath is known in the art as a Boule and is illustrated in FIG. 3.

The Boule is then heated to its drawing temperature and a fiber of the desired diameter is produced by elongating the Boule by means of suitable drawing apparatus. Drawing apparatus of this type is well known in the art and generally comprises a heater for the Boule and a drawing furnace comprising a capstan wheel around which the fiber is fed to a spool which accumulates the fiber. The desired fiber outer diameter is achieved by controlling the pulling force applied to the fiber as it is drawn from the Boule.

A specific example of the method of making a plastic optical fiber in accordance with the invention is set forth below:

A cylindrical core rod is extruded to a length of 18 inches and an outer diameter of $3.00_{-0}^{+0.010}$ inches. The core is made of polystyrene sold by the Dow Chemical Company under the name STYRON 686. This polystyrene has a yield strength of 7,900 P.S.I., a modulus of elasticity of 425,000 P.S.I., a hardness of ROCKWELL M76, a specific gravity of 1.04, a deflection temperature of 212° F., a melt viscosity of 3,200, and an index of refraction of 1.58.

A cylindrical tubular sheath is extruded having the following dimensions: an internal diameter of $3.00_{-0.010}^{+0}$ inches, an external diameter of 3.125 inches, and a length of 18 inches at room temperature. The sheath is made of a polymethyl methacrylate sold by Rohm & Haas Company under the trade designation PLEXIGLAS (optical grade) and having a tensile strength of 8,000 – 11,000 P.S.I., a hardness of ROCKWELL M80-100, a specific gravity of 1.17 – 1.20, a deflection temperature of 150°– 210° F., a softening temperature of 200° F. and an index of refraction of 1.48–1.50. The heat distortion point of the plastic is 200° F.

Figure 1:
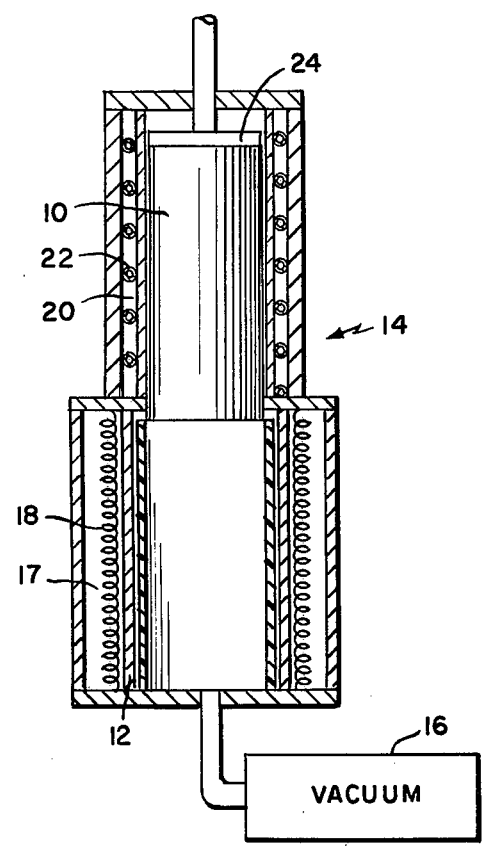
FIG. 1 is a sectional view of apparatus for use in performing the method in accordance with the invention.

The sheath and the rod are placed in a Boule forming unit such as that shown in FIG. 1 and the sheath is heated to the forming temperature T of about 185° F., while the core is maintained at approximately room temperature. A vacuum is maintained by a vacuum source. When the sheath reaches the forming temperature, the plunger is actuated to force the core into the sheath after which the assembly is allowed to cool in the vacuum to room temperature whereupon a Boule is formed as is shown in FIG. 3.

The Boule is then drawn to an extended length by conventional apparatus and techniques to thereby reduce the diameter of the fiber to that desired. By way of example, the Boule may be drawn to a length of about 50,000 feet having a diameter of 0.020 inches.

By reason of the shrinking action of the sheath onto the core in accordance with the method of the invention, an improved interface quality is achieved and can be controlled. Moreover, the improved quality will be achieved throughout the length of the fiber.

While the above description is specifically directed to the method for the making of a Boule having a single core and sheath, it will be apparent that the invention may be utilized to make a multiple-fiber Boule. In this case, the sheath would simply be provided with a plurality of cylindrical bores adapted to receive a plurality of cores which would be inserted therein prior to the shrinking step. Moreover, while it is preferable to shrink the sheath onto the core, it may be possible to cool the core and expand it onto the sheath. The invention is also applicable to fibers having shapes other than cylindrical, the practicality of various shapes being well known in the art.

Further, in accordance with a modified form of the invention, the sheath may be cast instead of being extruded. In fact, the sheath may be cast in the Boule former by pouring a sheath of a suitable liquid monomer (such as catalyzed acrylic or methacrylate monomers) about the previously formed core, raising the temperature within the former to promote polymerization of the monomer and allowing the core and sheath to cool with controlled shrinkage, i.e., by selecting the dimensions and volume of the core and sheath so that there will be a shrink fit therebetween. Also, the core may be cast into a previously formed sheath by the method described above.

It will be apparent that various changes may be made in the method in accordance with the invention without departing from the scope thereof as defined by the following claims.

I claim:

1. A method of making plastic optical fibers comprising the steps of pre-forming a rod-like core member of plastic, pre-forming a sheath member of plastic having a longitudinal internal passage shaped like but normally being smaller than the cross-section of said core member at room temperature, said core and sheath members being pre-formed to substantially the same length, said core member having an index of refraction greater than the index of refraction of said sheath member, placing said sheath member and said core member in a vacuum chamber of a Boule forming unit, operating heating units of said Boule forming unit to apply heat to said sheath member placed therein to raise and maintain the temperature of said sheath member above room temperature to enlarge the internal passage thereof such that said core member can be inserted into the internal passage of said sheath member, maintaining said core member at approximately room temperature in said Boule forming unit prior to insertion into said sheath member, thereafter inserting said core member into said internal passage of said sheath member, the internal passage of said sheath member being at said raised temperature at least slightly greater than and being at room temperature less than the external diameter of said core member at room temperature so that the sheath member will shrink onto said core member when said assembly is allowed to return to room temperature, allowing said assembled core member and sheath member to return toward room temperature in said vacuum chamber so that said sheath member will shrink tightly onto said core member homogeneously throughout the length thereof and form a Boule, and drawing said Boule to an increased length to form an optical fiber.

2. A method according to claim 1 wherein said core member is a cylindrical rod and said sheath member is a cylindrical tube having a single longitudinal internal passage extending axially therethrough, the temperature condition of said core member and said sheath member being such that the core member may be inserted into said sheath member without any substantial contact throughout the length thereof and said step of inserting said core member into said sheath member is performed while said sheath member is supported in a vertical stationary position within the Boule forming unit.

3. The method according to claim 2 wherein said core member is made of polystyrene and said sheath member is made of polymethyl methacrylate, said sheath member being at a temperature of about 185° F prior to insertion of said core member.

4. The method according to claim 1 wherein said core member is made of polystyrene and said sheath member is made of polymethyl methacrylate, said core member being cooled by the operation of cooling units of said Boule forming unit to maintain the same at room temperature prior to insertion into said sheath member.

5. A method of making plastic optical fibers comprising the steps of pre-forming a rod-like core member of plastic, forming a sheath member of plastic having a longitudinal internal passage shaped like but normally being smaller than the cross-section of said core member at room temperature, said core member being made of plastic having an index of refraction greater than the index of refraction of said sheath member, assembling said sheath member and said core member together in a vacuum chamber of a Boule forming unit with the axes thereof extending vertically under a temperature condition greater than room temperature, operating heating units of said Boule forming unit to apply heat to said sheath member therein so that said sheath member is at a temperature greater than said core member during said assembling thereof together, the dimensions of said core member and said sheath member being such that said assembly thereof can be achieved at said raised temperature and said sheath member would normally have an internal diameter at room temperature less than the external diameter of said core member at room temperature so that said sheath member will shrink onto said core member when said assembly is allowed to return to room temperature, allowing said assembled core member and sheath member to return toward room temperature in said vacuum chamber so that said sheath member will shrink tightly onto said core member homogeneously throughout the length thereof and form a Boule, and drawing said Boule to an increased length to form an optical fiber.

6. A method according to claim 5 wherein said sheath member is formed as a cast monomer.

7. A method according to claim 5 wherein said core member is formed as a cast monomer.

8. A method according to claim 6 wherein said raised temperature is sufficient to promote polymerization of said monomer.

9. A method according to claim 7 wherein said raised temperature is sufficient to promote polymerization of said monomer.

* * * * *